US012728848B2

(12) United States Patent
Yuan et al.

(10) Patent No.: US 12,728,848 B2
(45) Date of Patent: Sep. 8, 2026

(54) LATERAL INTERFERENCE PREVENTION MODULE AND METHOD FOR VEHICLE

(71) Applicant: Robert Bosch GmbH, Stuttgart (DE)

(72) Inventors: Xiaolong Yuan, Suzhou (CN); Qicheng Ge, Suzhou (CN); Thomas Brettschneider, Stuttgart (DE); Yueming Zhi, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 18/693,352

(22) PCT Filed: Aug. 18, 2022

(86) PCT No.: PCT/EP2022/073068

§ 371 (c)(1),
(2) Date: Mar. 19, 2024

(87) PCT Pub. No.: WO2023/057122

PCT Pub. Date: Apr. 13, 2023

(65) Prior Publication Data

US 2025/0128705 A1 Apr. 24, 2025

(30) Foreign Application Priority Data

Oct. 9, 2021 (CN) ......................... 202111174917.X

(51) Int. Cl.

| | |
|---|---|
| ***B60W 30/12*** | (2020.01) |
| ***B60W 30/14*** | (2006.01) |
| ***B60W 50/14*** | (2020.01) |

(52) U.S. Cl.

CPC .......... *B60W 30/12* (2013.01); *B60W 30/146* (2013.01); *B60W 50/14* (2013.01);

(Continued)

(58) Field of Classification Search

CPC .... B60W 30/12; B60W 30/146; B60W 50/14; B60W 2050/146; B60W 2420/403;

(Continued)

(56) References Cited

FOREIGN PATENT DOCUMENTS

| | | | | |
|---|---|---|---|---|
| DE | 102020108999 A1 | | 8/2020 | |
| DE | 102019124817 A1 | * | 3/2021 | ............ B60W 30/12 |

(Continued)

OTHER PUBLICATIONS

International Search Report corresponding to PCT Application No. PCT/EP2022/073068, mailed Dec. 15, 2022. (English language document). (3 pages).

*Primary Examiner* — Long T Tran
*Assistant Examiner* — Charles J Brauch
(74) *Attorney, Agent, or Firm* — Maginot, Moore & Beck LLP

(57) ABSTRACT

A lateral interference prevention module includes a memory, a processor, and a communication interface configured to be communicatively connected to a related system of a vehicle. This module is configured to obtain lateral interference-related information and vehicle-related information, determine a pre-deviation direction based on direction information of a lateral interference, and obtain a pre-deviation quantity by querying a comparison table or calculation based on parameter information of the lateral interference and the vehicle-related information. The table reflects correspondence between the parameter information of the lateral interference or a lateral acting force calculated from the parameter information, speed of the vehicle, and the pre-deviation quantity. The calculation calculates the pre-deviation quantity based on the lateral acting force, and plans a pre-deviation path, based on the pre-deviation quantity and the pre-deviation direction, including determining a starting (Continued)

distance from a position of the lateral interference and a deviation trajectory within the starting distance.

12 Claims, 2 Drawing Sheets

(52) U.S. Cl.
CPC . *B60W 2050/146* (2013.01); *B60W 2420/403* (2013.01); *B60W 2520/10* (2013.01); *B60W 2530/10* (2013.01); *B60W 2552/15* (2020.02); *B60W 2555/20* (2020.02); *B60W 2556/45* (2020.02)

(58) Field of Classification Search
CPC ......... B60W 2520/10; B60W 2530/10; B60W 2552/15; B60W 2555/20; B60W 2556/45; B60W 2552/53; B60W 2720/10; B60W 40/06; B60W 2754/20
See application file for complete search history.

(56) References Cited

FOREIGN PATENT DOCUMENTS

| | | | |
|---|---|---|---|
| EP | 3248857 | A1 | 11/2017 |
| EP | 3279062 | A1 | 2/2018 |

* cited by examiner

LATERAL INTERFERENCE PREVENTION MODULE AND METHOD FOR VEHICLE

This application is a 35 U.S.C. § 371 National Stage Application of PCT/EP2022/073068, filed on Aug. 18, 2022, which claims the benefit of priority to Serial No. CN 202111174917.X, filed on Oct. 9, 2021 in China, the disclosures of which are incorporated herein by reference in their entirety.

The present application relates to a lateral interference prevention module for a vehicle. This module may be provided as part of an advanced driver assistance system of a vehicle, or may be provided separately. The present application further relates to a lateral interference prevention method using the module.

BACKGROUND

At present, most vehicles have been equipped with an advanced driver assistance system (ADAS), including an adaptive cruise control (ACC) subsystem, an intelligent speed adaptation (ISA) subsystem, a vehicular communication subsystem (VCS), a lane departure warning subsystem (LDWS), a lane keeping subsystem (LKS), and many other subsystems or modules, and autonomous driving functions in many aspects have been well developed. For example, the adaptive cruise control and lane keeping systems can provide automatic longitudinal and lateral vehicle control under an overall supervision of a driver. However, some more complex subsystems or modules are still under development or optimization, such as a hands-free highway assist (HWA-HF) subsystem, a highway pilot (HWP) subsystem, or Robotaxis. In these more complex aspects, a vehicle system has a higher degree of responsibility, e.g. without any dependence on the driver at least in a certain period of time.

An ultimate goal of the lane keeping subsystem is to keep a vehicle in a target lane, or at least detect a danger of the vehicle departing from the lane early enough, to request a driver to take over the vehicle in a timely manner. However, an unexpected lateral interference that may cause a controller deviation may be hardly dealt with. The lateral interference of this type may be, for example, a sudden crosswind or an inclined road (such as a sloping bend), etc.

In these cases, there is a risk that a vehicle is traveling too close to a lane boundary line due to the lateral interference and the corresponding controller deviation, which will result in frequent or sudden requests for a driver to take over, and thus a reduced customer satisfaction with these functions. Even in emergencies, a driver may fail to take over a vehicle in a timely manner, such that the vehicle departs from a lane thereof. This is prone to a safety problem and has a high risk index.

It is desirable to address the above technical problems.

SUMMARY

An objective of the present application is to formulate countermeasures for a permanent lateral interference and an occasional temporary lateral interference in a traveling route of a vehicle before the vehicle reaches a position of the lateral interference, specifically by enabling the vehicle to present a pre-deviation quantity before the vehicle reaches the position of the lateral interference, for use in at least partially canceling or completely eliminating a lateral deviation of the vehicle that is caused by the lateral interference.

The objective is achieved by the lateral interference prevention module and method of the present application.

A first aspect of the present application relates to a lateral interference prevention module for a vehicle, the module including a memory, a processor, and a communication interface which is configured to be communicatively connected to a first vehicle system, where the lateral interference prevention module is configured to:

- obtain lateral interference-related information from the memory, where the lateral interference-related information includes direction information and parameter information of a lateral interference;
- obtain vehicle-related information from the first vehicle system, where the vehicle-related information includes at least a vehicle speed and a vehicle weight;
- using the processor, determine a pre-deviation direction based on the direction information of the lateral interference, and obtain a pre-deviation quantity by means of querying a comparison table or calculation based on the parameter information of the lateral interference and the vehicle-related information, where the comparison table reflects a correspondence between the parameter information of the lateral interference or a lateral acting force calculated from the parameter information, the vehicle speed of the vehicle, and the pre-deviation quantity, and the calculation refers to calculating the pre-deviation quantity based on the lateral acting force calculated from the parameter information; and
- plan a pre-deviation path based on the obtained pre-deviation quantity and the pre-deviation direction, where planning the pre-deviation path includes determining a starting distance from a position of the lateral interference and a deviation trajectory within the starting distance.

In an embodiment, the communication interface is further configured to communicate with a second vehicle system to obtain a traveling trajectory of the vehicle therefrom, and the lateral interference is a lateral interference on the traveling trajectory of the vehicle.

In an embodiment, the first vehicle system is an engine management system or an electronic stability program system, and the second vehicle system is a navigation system or a camera system.

In an embodiment, the lateral interference includes a permanent lateral interference and a temporary lateral interference.

In an embodiment, the communication interface is further configured to communicate with a cloud, to obtain information of a sudden temporary lateral interference and a real-time change in the lateral interference-related information.

In an embodiment, the lateral interference is a permanent or temporary crosswind, the direction information is a wind direction, and the parameter information is a wind intensity of the crosswind; or

- the lateral interference is a sloping bend, the direction information is an inclination direction of a slope, and the parameter information is an inclination angle of the slope.

In an embodiment, the comparison table stores a minimum pre-deviation quantity, a minimum pre-deviation quantity recommended value, a maximum pre-deviation quantity, and a maximum pre-deviation quantity recommended value, and the pre-deviation quantity obtained by the processor is the minimum pre-deviation quantity recommended value.

A second aspect of the present application relates to a lateral interference prevention method performed by using the foregoing lateral interference prevention module for a vehicle, the method including:

a step of obtaining lateral interference-related information, where the lateral interference-related information includes direction information and parameter information of a lateral interference;

a step of obtaining vehicle-related information, where the vehicle-related information includes at least a vehicle speed and a vehicle weight;

a step of determining a pre-deviation direction based on the direction information of the lateral interference, and obtaining a pre-deviation quantity by means of querying a comparison table or calculation based on the parameter information of the lateral interference and the vehicle-related information, where the comparison table reflects a correspondence between the parameter information of the lateral interference or a lateral acting force calculated from the parameter information, the vehicle speed of the vehicle, and the pre-deviation quantity, and the calculation refers to calculating the pre-deviation quantity based on the lateral acting force calculated from the parameter information; and a step of planning a pre-deviation path based on the obtained pre-deviation quantity and the pre-deviation direction, where planning the pre-deviation path includes determining a starting distance from a position of the lateral interference and a deviation trajectory within the starting distance.

In an embodiment, this lateral interference prevention method further includes sending the calculated pre-deviation path to a control system of the vehicle to control the traveling of the vehicle.

In an embodiment, this lateral interference prevention method further includes a step of displaying the calculated pre-deviation path.

In an embodiment, the step of obtaining lateral interference-related information and the step of obtaining vehicle-related information are performed simultaneously.

In an embodiment, the step of obtaining vehicle-related information further includes: determining whether a vehicle speed of the vehicle when traveling by the starting distance exceeds a vehicle speed limit value set for the lateral interference, and when the vehicle speed exceeds the vehicle speed limit value, reducing the vehicle speed to the vehicle speed limit value in the comparison table.

In an embodiment, this lateral interference prevention method further includes: determining whether a current position of the vehicle is beyond the starting distance, and taking a minimum pre-deviation quantity recommended value for the pre-deviation quantity when the current position of the vehicle is beyond the starting distance; or taking a maximum pre-deviation quantity for the pre-deviation quantity when the current position of the vehicle is within the starting distance.

A third aspect of the present application relates to a computer-readable storage medium having stored thereon executable instructions that, when executed, cause a processor or a computer to perform a lateral interference prevention method described above.

According to the lateral interference prevention module and method of the present application, based on lateral interference-related parameters and vehicle-related parameters, a pre-deviation quantity of a vehicle when reaching a position of a lateral interference and a pre-deviation path for implementing the pre-deviation quantity are determined, to ensure that the vehicle can present the pre-deviation quantity when the vehicle reaches the position of the lateral interference, thereby achieving the purpose of at least partially canceling or completely eliminating a deviation of the vehicle that is caused by the lateral interference. Ultimately, it can be ensured that, an actual deviation quantity presented by the vehicle upon reaching the position of the lateral interference is within a preset threshold, which is set based on subsystems associated with same. For example, this preset threshold is set to ensure that the actual deviation quantity of the vehicle is within a range of a lane keeping system. Alternatively, this preset threshold is set to ensure that the vehicle does not trigger a warning against lane departure.

This further enables the vehicle to be prepared for upcoming lateral interferences or loads, to prevent frequent or sudden triggering of a warning by the vehicle in the event of inadequate preparation. Frequent requests, from these related subsystems, for the driver to take over, thus bringing about an unsatisfactory driving experience for customers, can be prevented, and sudden requests, from the vehicle, for the driver to take over, such that the driver fails to take over the vehicle in a timely manner, resulting in a safety accident, can also be prevented. The setting of this module significantly reduces the risk of the vehicle departing from a lane thereof.

The present application can not only deal with an influence of the permanent lateral interference, but also takes the temporary lateral interference (such as a sudden strong wind) into consideration, with complete and robust functions, thereby providing a favorable supplement to the current advanced driver assistance system and providing customers with flexible options.

BRIEF DESCRIPTION OF THE DRAWINGS

The above and other features and advantages of the present disclosure can be well understood from the embodiments given below with reference to the accompanying drawings. Those skilled in the art should appreciate that the accompanying drawings are merely schematic and illustrative of the principles of the present disclosure, and are not drawn to scale. In the drawings.

DETAILED DESCRIPTION

Figure 1:
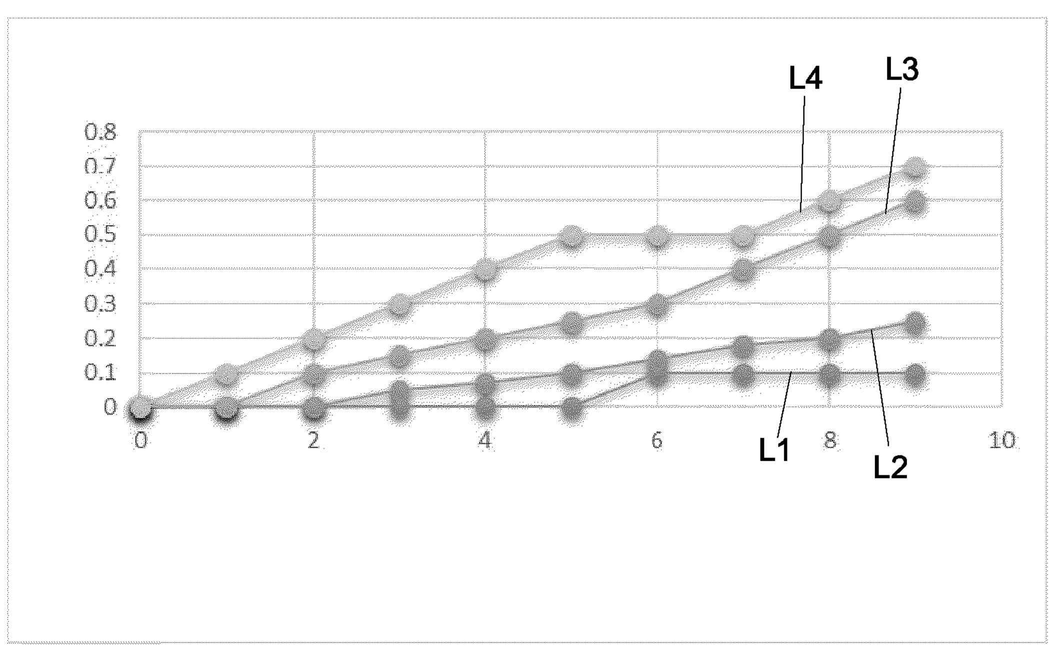
FIG. 1 is a comparison table of crosswind intensity and pre-deviation quantity for a specific vehicle speed according to an embodiment.

The present application provides a lateral interference prevention module. As the name suggests, this module is aimed at a situation where there is a lateral interference in a traveling route of a vehicle, i.e., in front of a current position of the vehicle. This module is configured to calculate, in advance and before the vehicle reaches the position of the lateral interference, a pre-deviation quantity for the vehicle (indicating a deviation of the vehicle from a lane centerline) that the vehicle should have or present to reach a position of a lateral interference, so that when the vehicle actually reaches the position of the lateral interference, a lateral position (or an actual deviation quantity) of the vehicle is a superimposition (or a vector sum) of this pre-deviation quantity and an external load deviation quantity of the vehicle that is caused by the lateral interference. In other words, the external load deviation quantity of the vehicle that is caused by the lateral interference is at least partially canceled by the pre-deviation quantity calculated by this module, so that an actual lateral position of the vehicle is still approximately in the middle of the lane, or within a certain preset threshold. This preset threshold may be a value corresponding to the triggering of a lane keeping system or a lane departure warning system, or may be set as required by any other associated subsystems in an advanced driver assistance system.

As described above, the above preset threshold for this module can be set according to any related subsystems in the advanced driver assistance system configured in the vehicle, and therefore, this module may be provided, in combination with any of the related subsystems, as part of the advanced driver assistance system.

For example, when the above preset threshold is set according to a requirement that the lane keeping subsystem or the vehicle departure warning subsystem should be triggered, this module may be used in combination with either of the two. At this time, the setting of this module can prevent the triggering of a lane keeping system or lane departure warning due to a (sudden) large lateral deviation of the vehicle when the vehicle reaches the position of this lateral interference, thus resulting in the vehicle being much too close to a boundary line of a lane or even crossing the boundary line of the current lane. Therefore, the use of this module in combination with the above two subsystems can make their functions more perfect.

In some embodiments, this lateral interference prevention module may be provided independently of the subsystems in the advanced driver assistance system, or independently of the entire advanced driver assistance system.

The term "lateral interference" (or referred to as "lateral external load") of the present application refers to any external load that can enable a vehicle, which is normally traveling in a lane, to be deviated laterally upon acting on the vehicle. This external load subjects the vehicle to a large lateral deviation, which is, for example, large enough to trigger a warning in the related subsystem (such as the lane keeping subsystem or the lane departure warning subsystem) of the advanced driver assistance system.

The lateral interferences involved in the present application may be permanent lateral interferences, and these lateral interferences are terrain-related and naturally occurring, without relying on traveling vehicle-related information. For example, in an embodiment, the lateral interference may be a crosswind at a tunnel exit. In an embodiment, the lateral interference may be, for example, a sloping road on which a bend is formed, or a sloping lane.

The lateral interferences involved in the present application may be non-permanent temporary lateral interferences, and these lateral interferences exhibit temporary and sudden features. For example, an example of such a lateral interference is a sudden cyclone or gust.

The lateral interference prevention module of the present application is configured to obtain lateral interference-related information, and also obtain vehicle-related information.

The lateral interference-related information may be obtained from an on-board memory in an off-line manner. The lateral interference prevention module of the present application may include its own memory for storing the lateral interference-related information, or be communicatively connected to other on-board memories that store the information about the lateral interference. Optionally, the module of the present application may include a network interface to obtain or receive real-time temporary lateral interference-related information, such as real-time road or weather information or data, from devices or facilities such as a cloud, a mobile phone, a traffic management center, or a traffic management bureau in an on-line manner, for example, via V2X, 4G/5G, etc.

The lateral interference-related information may include direction information and parameter information. When the lateral interference is a crosswind, the direction information is a wind direction of the crosswind, and the parameter information may be wind scale or intensity information. When the lateral interference is a sloping lane, the direction information is an inclination direction of a slope, and the parameter information may be an inclination angle of the slope.

The lateral interference prevention module of the present application may be communicatively connected to an engine management system (EMS) or electronic stability program (ESP) system of the vehicle or any other vehicle systems, to obtain the vehicle-related information. This related information may include at least a vehicle speed of the vehicle, a weight of the vehicle (e.g. a sum of a deadweight of the vehicle and a weight of a load inside the vehicle), a real-time position of the vehicle, and other information.

The lateral interference prevention module of the present application is further configured to obtain or determine the pre-deviation quantity Pre-A of the vehicle by means of querying the comparison table based on the obtained lateral interference-related information and the vehicle-related information.

FIG. 1 shows an embodiment of a crosswind intensity-pre-deviation quantity comparison table of when a vehicle speed is 100 KPH and a lateral interference is a crosswind. In FIG. 1, the abscissa is wind intensity (i.e., commonly known as "wind scale"), and the ordinate is pre-deviation quantity (unit: meter). Curve L1 is a minimum pre-deviation quantity Pre-Amin, which is obtained based on the tolerance of distance of a vehicle from a lane boundary line in a lane keeping system of an advanced driver assistance system of the vehicle. Curve L2 is a minimum pre-deviation quantity recommended value PreR-Δmin. The minimum pre-deviation quantity recommended value PreR-Δmin is slightly greater than the minimum pre-deviation quantity Pre-Δmin, and has a higher safety factor. Curves L3 and L4 are respectively a maximum pre-deviation quantity recommended value PreR-Δmax and a maximum pre-deviation quantity Pre-Δmax. The former is slightly less than the latter, and has a higher safety factor.

At the vehicle speed of 100 KPH, upon obtaining the intensity or scale of the crosswind, a value of the pre-deviation quantity can be obtained by querying this comparison table. The comparison table of FIG. 1 is in the form of crosswind intensity-pre-deviation quantity correspondence. In another embodiment, this module can first calculate a lateral acting force of the crosswind on the vehicle, and in this case, the comparison table can be in the form of lateral acting force-pre-deviation quantity correspondence. The calculation of the lateral acting force of the crosswind that is applied to the vehicle can be based on the following formula:

$$F_y = \frac{1}{2} A \rho V'^2 C_s \tag{1}$$

where $F_y$ is the lateral acting force; A is a projected area of a windward surface of the vehicle that is obtained based on vehicle-related parameters; ρ is an air density; V' is a relative velocity of synthesis gas flow; and $C_s$ is a lateral force parameter.

Similarly, when the lateral interference is a sloping lane and the vehicle speed and an inclination angle of a slope are obtained, the value of the pre-deviation quantity can also be obtained by means of accessing the comparison table. Optionally, in another embodiment, this module can first calculate a lateral acting force of the sloping lane on the vehicle, and in this case, the comparison table can be in the form of lateral acting force-pre-deviation quantity correspondence. The calculation of the lateral acting force of the sloping lane that is applied to the vehicle can be based on the following formula:

$$F_y = mg\sin\theta \quad (2)$$

where $F_y$ is the lateral acting force; m is a vehicle mass; g is a gravitational acceleration; and ϑ is the inclination angle of the slope.

In an embodiment, when the lateral acting force generated by the lateral interference is obtained, the pre-deviation quantity can also be obtained by means of calculation in addition to querying the comparison table.

It can be known from the lateral acting force that a lateral acceleration of the vehicle due to the lateral interference is: $a_y=F_y/m$. A lateral deviation caused after applying the lateral interference for t is:

$$d = \frac{1}{2}a_y t^2$$

The time t may be 2 seconds. A control coefficient α is applied to this lateral deviation d to obtain the pre-deviation quantity Pre-Δ=ad.

Considering a lateral error factor, the control coefficient α may range from 0.1 to 0.5, for example, 0.3.

In summary, by using the lateral interference prevention module of the present application, the pre-deviation quantity can be obtained by means of querying the comparison table or calculation based on the lateral interference-related information and the vehicle-related information.

By using the lateral interference prevention module of the present application, a pre-deviation direction is further determined based on a direction of the lateral interference (or the lateral acting force applied to the vehicle). The pre-deviation direction is opposite to a direction of the lateral acting force of the lateral interference that is applied to the vehicle, relative to a lane centerline.

After the pre-deviation quantity and the pre-deviation direction are determined, the lateral interference prevention module of the present application can determine a pre-deviation path for a pre-deviation of the vehicle. The determination includes: determining a starting distance D, that is, a distance from the position of the lateral interference for the vehicle to start a pre-deviation; and determining a vehicle deviation trajectory, that is, a path that the vehicle should follow to have the above-determined pre-deviation quantity in the above-determined pre-deviation direction when the vehicle reaches the position of the lateral interference, which is represented by curve L in FIG. 2.

Upon obtaining an estimated end position (i.e., a position from a lane centerline by the above pre-deviation quantity in the above pre-deviation direction) of the vehicle, means for obtaining the above pre-deviation path are known in the art, and only one feasible exemplary implementation is provided here. After the pre-deviation quantity is obtained, an acceleration and a speed at the estimated end position of the vehicle can be estimated, and the trajectory can be obtained by using a method of quintic polynomial based on the current acceleration, speed, and position of the vehicle. That is, $$d(s) = d_0 + d_1\cdot s + d_2\cdot s^2 + d_3\cdot s^3 + d_4\cdot s^4 + d_s\cdot s^5$$

where $d_i$ are coefficients of the polynomial, d(s) is a distance from the trajectory to a reference line, and s is a longitudinal distance in a Frenet coordinate system.

Afterwards, the lateral interference prevention module of the present application sends the determined pre-deviation path to the control system of the vehicle, so that the control system controls the vehicle to travel according to the pre-deviation path L after the vehicle travels by the starting distance.

Figure 2:
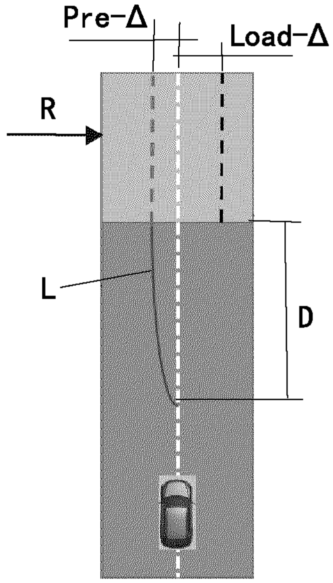
FIG. 2 is a schematic diagram of a lateral interference prevention module according to the present application.

In this way, the actual deviation quantity of the vehicle when reaching the position of the lateral interference is a vector sum of the pre-deviation quantity Pre-Δ of the vehicle from the lane centerline in the pre-deviation direction and the external load deviation quantity Load-Δ of the vehicle that is caused by the lateral interference, as shown in FIG. 2. An arrow R in FIG. 2 indicates a direction of a lateral interference or a lateral load (a crosswind), an upper half region in FIG. 2 is a region with the lateral interference, and a lower half region therein is a region without the lateral interference. Preferably, an actual deviation quantity of the vehicle when reaching a position of the lateral interference is 0, or is within a preset threshold as previously described.

Figure 3:
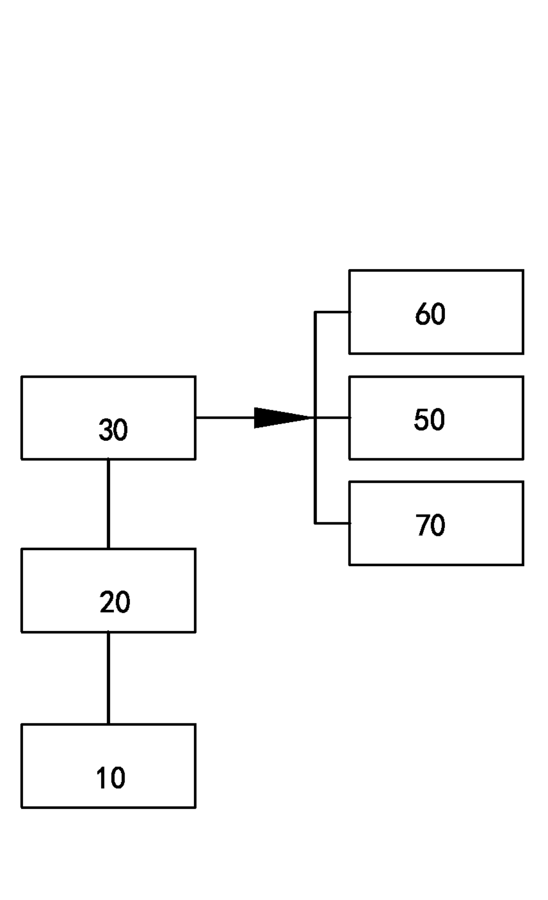
FIG. 3 is a block diagram of the constitution of a lateral interference prevention module according to the present application.

The principle of the lateral interference prevention module of the present application is specifically described above. FIG. 3 is a structural block diagram of the lateral interference prevention module according to the present application. The module generally includes a memory 10, a processor 20, and a communication interface 30. The memory 10 is configured to store various parameters, formulas and algorithms used to implement the above functions, including, but not limited to, information about a permanent lateral interference, a comparison table of lateral interference and pre-deviation quantity correspondence, etc.

The processor 20 is configured to obtain, for example, information about a lateral interference and the comparison table from the memory 10, determine a pre-deviation direction, obtain a pre-deviation quantity Pre-Δ by means of accessing the comparison table, and obtain, through calculation, a pre-deviation path L based on the obtained pre-deviation quantity.

The communication interface 30 may be configured to be communicatively connected to a first vehicle system 50 (e.g. an engine management system or an electronic stability program system) to obtain real-time information of a vehicle, such as a current position of the vehicle, body size information of the vehicle, and weight information of the vehicle, and is configured to, after obtaining the pre-deviation path including a starting distance D and a deviation trajectory L, send same to a control system, so that the control system controls the vehicle according to the pre-deviation path.

In an embodiment, the communication interface 30 may be further configured to communicate with a second vehicle system 60 (e.g. a navigation system or a camera system) to obtain a traveling route of the vehicle. The processor 20 obtains, from the memory 10, a lateral interference on the traveling route of the vehicle, and information about the lateral interference.

In an embodiment, the communication interface 30 may be further configured to communicate with a remote traffic facility or information center 70 (such as a cloud, a traffic management bureau, or a traffic management center) via any feasible network, to obtain real-time road condition and weather information. For example, it is windy ahead on the traveling route of the vehicle.

In an embodiment, this module further includes a display or communicates with an existing display on the vehicle, such as with a display inherent to the navigation system, so that the pre-deviation quantity, the pre-deviation direction, and the pre-deviation path are displayed on the display for view by a driver visually.

Figure 4:
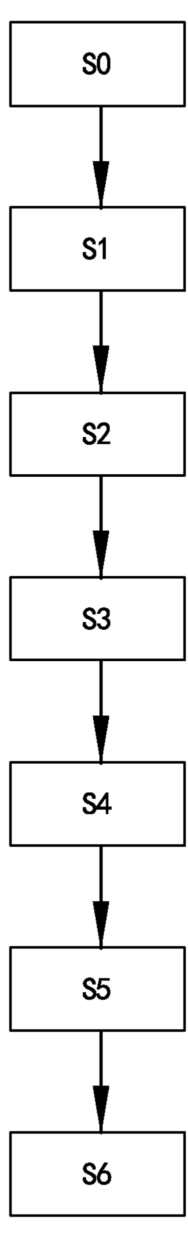
FIG. 4 is a flowchart of operation steps of a lateral interference prevention method according to the present application.

FIG. 4 is a flowchart of operations of a lateral interference prevention module according to the present application. The lateral interference prevention method performed by using the above-mentioned module may include the following steps:

- a module start step S0;
- an optional step S1: obtaining information about a traveling route of a vehicle;
- step S2: obtaining information about a lateral interference on the traveling route of the vehicle;
- step S3: obtaining vehicle-related information;
- step S4: obtaining a pre-deviation quantity Pre-Δ by means of querying a comparison table or calculation based on the information about the lateral interference and the vehicle-related information, and obtaining a pre-deviation direction;
- step S5: planning a pre-deviation path of the vehicle based on the obtained pre-deviation quantity Pre-Δ and the pre-deviation direction; and
- an optional step S6: sending the planned pre-deviation path to a control system of the vehicle, to control the vehicle according to the planned pre-deviation path.

As described above, the optional step S1 can be realized from a navigation system of the vehicle, or a camera system thereof.

The information about the lateral interference that is obtained in step S2 includes: direction information, such as a wind direction or an inclination direction of a sloping lane; and parameter information representing the lateral interference, such as a wind intensity or scale or an inclination angle of a slope. If there are a plurality of lateral interference items on the traveling route of the vehicle, the steps of determining the pre-deviation quantity and the pre-deviation direction as well as the pre-deviation path are performed for each lateral interference item.

The vehicle-related information obtained in step S3 includes at least a vehicle speed of the vehicle, and may also include, for example, a weight of the vehicle, a body size of the vehicle, etc.

The pre-stored comparison table queried in step S4 may be a two-dimensional relational table between lateral interference parameters and pre-deviation quantity values for a specific vehicle speed as shown in FIG. 1, or may be a three-dimensional relational table between lateral interference parameters and pre-deviation quantity values for different vehicle speeds.

The planning of the pre-deviation path of the vehicle based on the obtained pre-deviation quantity Pre-Δ and the pre-deviation direction in step S5 can be performed in any manner known to those skilled in the art, which is not limited to the method listed above.

Optionally, in an embodiment, the lateral interference prevention method of the present application further includes a step of displaying the pre-deviation quantity and the pre-deviation direction obtained by this module or displaying the pre-deviation path.

Optionally, in an embodiment, a vehicle speed limit value is specified for each type of lateral interference. The lateral interference prevention method of the present application further includes the following steps: determining whether a vehicle speed of the vehicle exceeds a vehicle speed limit value corresponding to the lateral interference when the vehicle travels by the starting distance D of the pre-deviation path, and when the vehicle speed exceeds the vehicle speed limit value, reducing the vehicle speed to the vehicle speed limit value.

Optionally, in an embodiment, the lateral interference prevention method of the present application further includes the following steps: determining whether a current position of the vehicle is beyond the obtained starting distance D, and taking a maximum pre-deviation quantity in the comparison table for the pre-deviation quantity when the current position of the vehicle is within the obtained starting distance D, otherwise, taking a minimum pre-deviation quantity recommended value in the comparison table for the pre-deviation quantity.

The lateral interference prevention module and method according to the principles of the present application are described in detail above, in which the vehicle has a pre-deviation quantity in the pre-deviation direction when the vehicle reaches the position of the lateral interference, such that when the vehicle is actually subjected to the lateral interference, the vehicle presents an actual lateral deviation that is small and even canceled by the pre-deviation quantity to zero. This prevents the triggering of each related subsystem warning during a huge lateral deviation of the vehicle, thereby reducing the number of times the driver of the vehicle is requested to take over the control of the vehicle, minimizing the burden on the driver, and also reducing the probability of the occurrence of a traffic accident due to the driver's failure to take over the vehicle in a timely manner.

Using the module of the present application, it is possible to plan a pre-deviation quantity and a pre-deviation path for permanent lateral interferences; it is also possible to make an advanced plan for sudden temporary lateral interferences based on road and weather data received in real time on-line. In the present application, the calculation and determination of the pre-deviation quantity and the pre-deviation path are related to the real-time changes in the vehicle speed and vehicle weight of the vehicle, and the lateral interference, so that the data is adjusted in a timely manner and the performance is robust, and the burden on the driver is minimized, thereby improving the driving experience of the driver.

The lateral interference prevention module of the present application may be implemented by hardware or software or a combination of software and hardware. The hardware may be one or more application-specific integrated circuits (ASICs), digital signal processors (DSPs), digital signal processing devices (DSPDs), programmable logic controllers (PLCs), field-programmable gate arrays (FPGAs), processors, controllers, microcontrollers, microprocessors, electronic units designed to carry out their functions, or a combination thereof. The software can then be implemented by means of microcode, program code, or code segments, which can also be stored in a machine-readable storage medium such as a storage component.

The present application further relates to a computer-readable storage medium having stored thereon executable instructions that, when executed, cause a processor or a computer to perform a lateral interference prevention method described above.

Those skilled in the art should appreciate that the drawings and the above description provide only some, but not all, of implementations that can implement the present application. Without departing from the scope of protection defined by the claims, operations of modifying, omitting, adding, etc. some structural details of the embodiments can be made by those skilled in the art, and these operations are all intended to be covered by the scope of protection of the present application.

The invention claimed is:

1. A lateral interference prevention module for a vehicle, comprising:

a memory;

a processor; and a communication interface which is configured to be communicatively connected to a first vehicle system, wherein the lateral interference prevention module is configured to:

obtain lateral interference-related information from the memory, wherein the lateral interference-related information comprises direction information and parameter information of a lateral interference;

obtain vehicle-related information from the first vehicle system, wherein the vehicle-related information comprises at least a vehicle speed and a vehicle weight;

using the processor, determine a pre-deviation direction based on the direction information of the lateral interference, and obtain a pre-deviation quantity by querying a comparison table or calculation based on the parameter information of the lateral interference and the vehicle-related information, wherein the comparison table reflects a correspondence between the parameter information of the lateral interference or a lateral acting force calculated from the parameter information, the vehicle speed of the vehicle, and the pre-deviation quantity, and the calculation refers to calculating the pre-deviation quantity based on the lateral acting force calculated from the parameter information; and plan a pre-deviation path based on the obtained pre-deviation quantity and the pre-deviation direction, wherein planning the pre-deviation path comprises determining a starting distance from a position of the lateral interference and a deviation trajectory within the starting distance, wherein the starting distance is a distance before the position of the lateral interference for the vehicle to start a pre-deviation, the comparison table stores a minimum pre-deviation quantity, a minimum pre-deviation quantity recommended value, a maximum pre-deviation quantity, and a maximum pre-deviation quantity recommended value; and the pre-deviation quantity obtained by the processor is the minimum pre-deviation quantity recommended value, and the lateral interference prevention module is further configured to determine a current position of the vehicle, and wherein at least one of the pre-deviation quantity is based on the minimum pre-deviation quantity or the minimum pre-deviation quantity recommended value when a first distance from the determined current position to the position of the lateral interference is not less than the starting distance, and the pre-deviation quantity is based on the maximum pre-deviation quantity or the maximum pre-deviation quantity recommended value when a second distance from the determined current position to the position of the lateral interference is less than the starting distance.

2. The lateral interference prevention module for a vehicle according to claim 1, wherein:

the communication interface is further configured to communicate with a second vehicle system to obtain a traveling trajectory of the vehicle therefrom; and the lateral interference is a lateral interference on the traveling trajectory of the vehicle.

3. The lateral interference prevention module for a vehicle according to claim 2, wherein:

the first vehicle system is an engine management system or an electronic stability program system; and the second vehicle system is a navigation system or a camera system.

4. The lateral interference prevention module for a vehicle according to claim 1, wherein the lateral interference comprises a permanent lateral interference and a temporary lateral interference.

5. The lateral interference prevention module for a vehicle according to claim 4, wherein the communication interface is further configured to communicate with a cloud to obtain information about a sudden temporary lateral interference and a real-time change in the lateral interference-related information.

6. The lateral interference prevention module for a vehicle according to claim 1, wherein:

the lateral interference is a permanent or temporary crosswind, the direction information is a wind direction, and the parameter information is a wind intensity of the permanent or temporary crosswind; or the lateral interference is a sloping bend, the direction information is an inclination direction of a slope, and the parameter information is an inclination angle of the slope.

7. A lateral interference prevention method performed by using a lateral interference prevention module for a vehicle according to claim 1, comprising:

obtaining lateral interference-related information, wherein the lateral interference-related information comprises direction information and parameter information of a lateral interference;

obtaining vehicle-related information, wherein the vehicle-related information comprises at least a vehicle speed and a vehicle weight;

determining a pre-deviation direction based on the direction information of the lateral interference;

obtaining a pre-deviation quantity by querying a comparison table or calculation based on the parameter information of the lateral interference and the vehicle-related information, wherein the comparison table reflects a correspondence between the parameter information of the lateral interference or a lateral acting force calculated from the parameter information, the vehicle speed of the vehicle, and the pre-deviation quantity, and the calculation refers to calculating the pre-deviation quantity based on the lateral acting force calculated from the parameter information; and planning a pre-deviation path based on the obtained pre-deviation quantity and the pre-deviation direction, wherein planning the pre-deviation path comprises determining a starting distance from a position of the lateral interference and a deviation trajectory within the starting distance, wherein the starting distance is a distance before the position of the lateral interference for the vehicle to start a pre-deviation, and wherein the method further includes one of determining that a current position of the vehicle is beyond the starting distance and taking a minimum pre-deviation quantity recommended value for the pre-deviation quantity based upon the determination that the current position of the vehicle is beyond the starting distance, and taking a maximum pre-deviation quantity for the pre-deviation quantity when the current position of the vehicle is within the starting distance.

8. The lateral interference prevention method according to claim 7, further comprising sending the calculated pre-deviation path to a control system of the vehicle to control the traveling of the vehicle.

9. The lateral interference prevention method according to claim 7, further comprising displaying the calculated pre-deviation path.

10. The lateral interference prevention method according to claim 7, wherein obtaining lateral interference-related information and obtaining vehicle-related information are performed simultaneously.

11. The lateral interference prevention method according to claim 7, wherein obtaining vehicle-related information further comprises:

determining that a vehicle speed of the vehicle when traveling by the starting distance exceeds a vehicle speed limit value set for the lateral interference; and based upon the determination that the vehicle speed exceeds the vehicle speed limit value, reducing the vehicle speed to the vehicle speed limit value in the comparison table.

12. A computer-readable storage medium having stored thereon executable instructions that, when executed, cause a processor or a computer to perform a lateral interference prevention method according to claim 7.

* * * * *